May 7, 1935.  H. C. JONES  2,000,520
APPARATUS FOR SECURING REGISTRATION POSITION OF AN ARTICLE
Filed April 19, 1929  4 Sheets-Sheet 1

INVENTOR
Harry C. Jones.
BY Warren E. Willis.
his ATTORNEY

May 7, 1935.  H. C. JONES  2,000,520
APPARATUS FOR SECURING REGISTRATION POSITION OF AN ARTICLE
Filed April 19, 1929   4 Sheets-Sheet 2
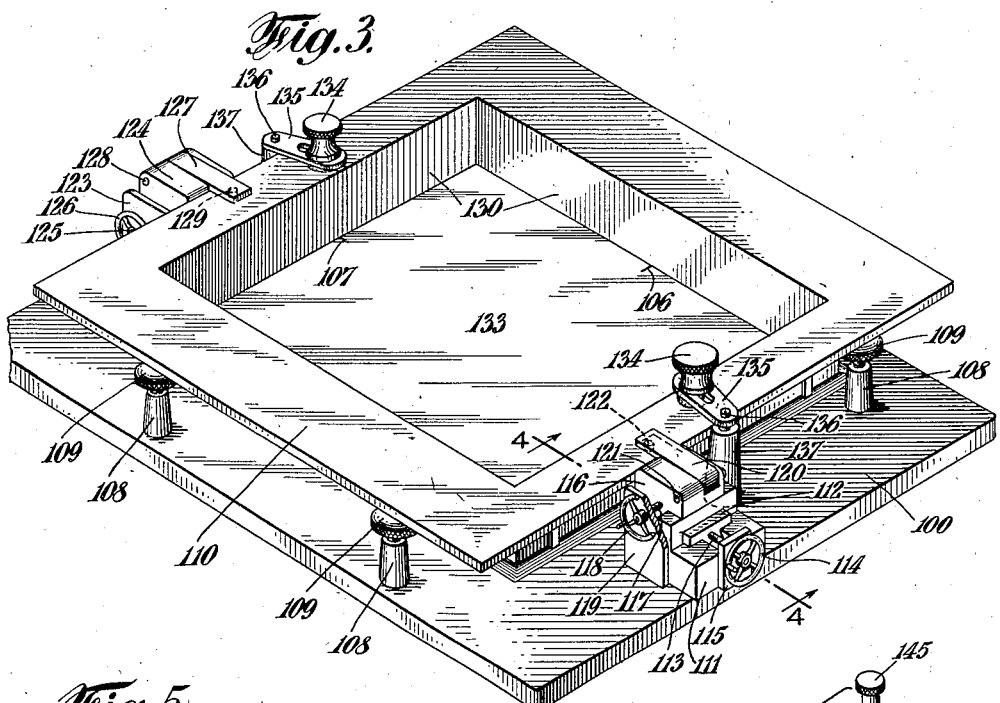
INVENTOR
Harry C. Jones.
BY
Warren E. Willis,
his ATTORNEY May 7, 1935.  H. C. JONES  2,000,520
APPARATUS FOR SECURING REGISTRATION POSITION OF AN ARTICLE
Filed April 19, 1929   4 Sheets-Sheet 3
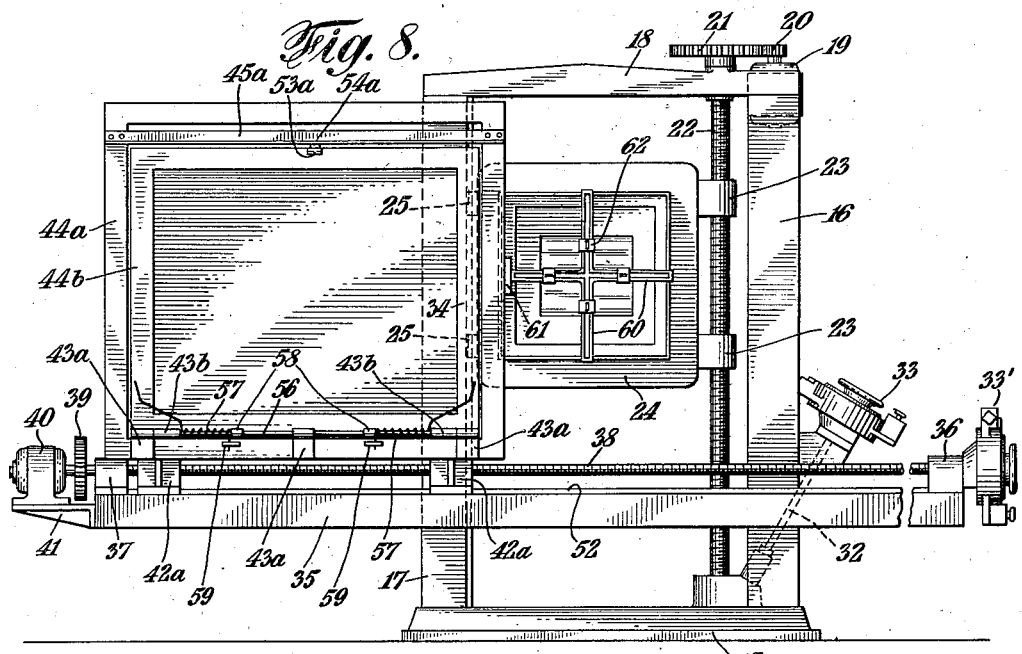
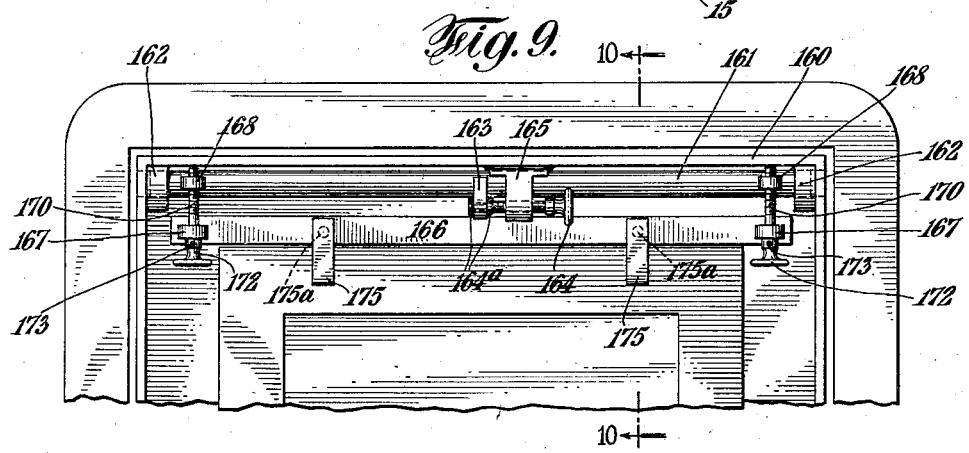
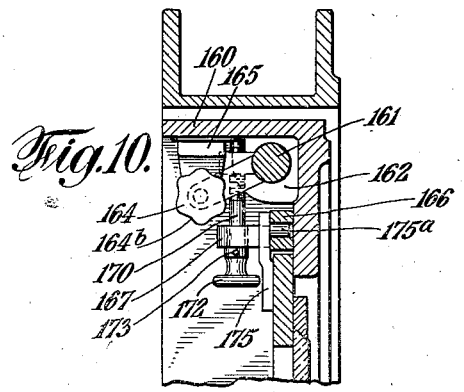
INVENTOR
Harry C. Jones.
BY
Warren E. Willis.
his ATTORNEY May 7, 1935.  H. C. JONES  2,000,520
APPARATUS FOR SECURING REGISTRATION POSITION OF AN ARTICLE
Filed April 19, 1929  4 Sheets-Sheet 4
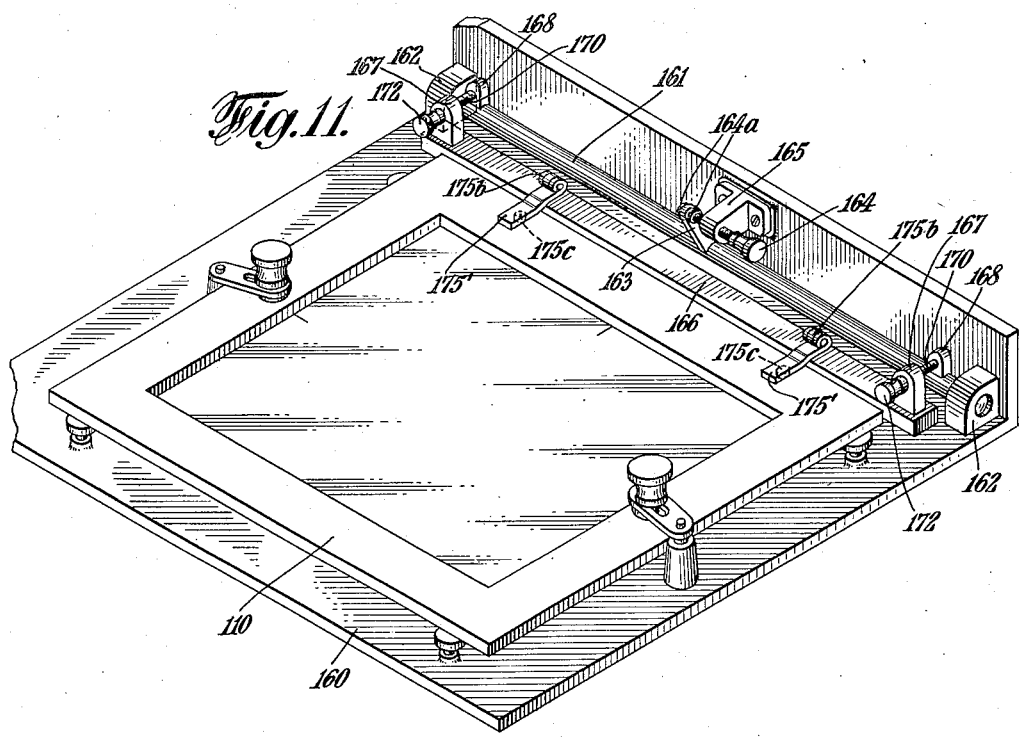
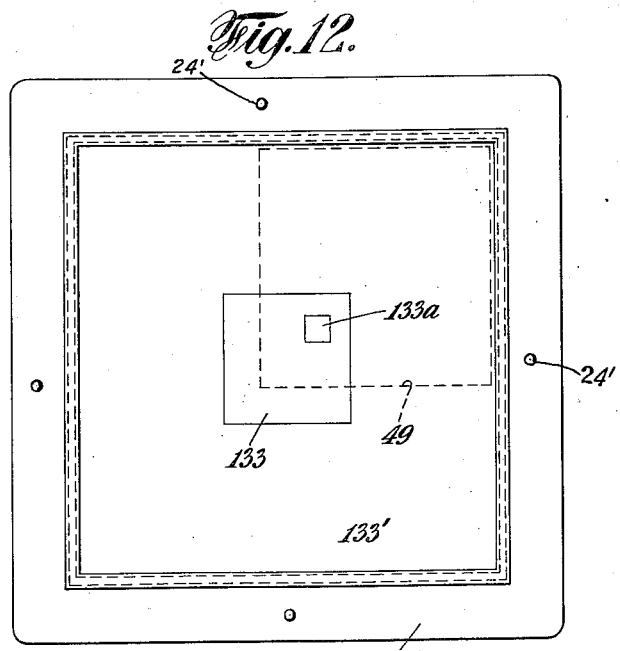
INVENTOR
*Harry C. Jones.*
BY
*Warren E. Willis.*
his ATTORNEY Patented May 7, 1935

2,000,520

UNITED STATES PATENT OFFICE 2,000,520

APPARATUS FOR SECURING REGISTRATION POSITION OF AN ARTICLE

Harry C. Jones, New York, N. Y.

Application April 19, 1929, Serial No. 356,326

26 Claims. (Cl. 33—184.5)

This invention relates to apparatus for securing registration position of an object, particularly to apparatus adapted to accurately position an object to be operated upon with respect to reference marks, lines or reference position on an adjacent object.

The invention is especially applicable to machines such as photo-composing machines, although its field of usefulness also includes other mechanisms and apparatus, such as cameras, scientific instruments, printing devices and many other devices in which accuracy is essential.

By way of illustration the invention will be described in connection with its adaptation to photo-composing machines, since this type of machine requires a greater degree of precision than others to which the invention is applicable.

In machines of this character, it is necessary to place the photographic plate, to be printed from, in a certain relative predetermined position on the machine. This is required since the design or image on this plate either is printed in successive positions on a sensitized surface carried on the machine, or is printed in definite relation to exposures of other images printed on the same or other sensitized surface; therefore, in order that the exposures may be placed precisely where desired, the plate must be placed on the machine in a definite, predetermined relative position.

Heretofore, it has been customary to place the plate in a registration apparatus and mark the plate or otherwise indicate the position which it is to assume in a holder, and then place the plate in the holder gaging its position in the holder by the mark or other indicating means. The holder was provided with fixed physical registration means adapted to cooperate with fixed physical registration means carried by the machine, and was positioned on the machine by means of these fixed physical registration means.

At other times, a double frame arrangement has been employed, in which case the plate was attached to the inner frame. The outer frame was provided with fixed physical registration means adapted to fit cooperating fixed registration means on the machine. The outer frame was provided with an adjusting thumb screw on each respective side thereof, and the inner screw ends engaged the outside of the inner frame on each respective side.

The thumb screws on corresponding opposite sides were separately but simultaneously adjusted in order to adjust the plate and when proper adjustment had been reached, the two frames were placed on the machine with the fixed physical registration means of the outer frame in engagement with the fixed physical registration means of the machine. This mode of registration necessitated the simultaneous adjustment of two members for a single motion and requires much time and a high degree of accuracy.

In the present invention the plate is placed directly in the holder and fastened thereto. This holder is provided with adjustable physical registration means which are wholly removable from the frame at will. The holder is placed on suitable apparatus which carries fixed registration means simulating those carried on the machine and adapted to engage the adjustable physical registration means carried on the holder, so that the engaging part of the adjustable registration means of the holder is at all times held in such relation that it will fit the fixed registration means of the machine. The holder is then moved with respect to said adjustable registration means until the plate is moved into correctly adjusted relative position. Then the adjustable registration means is locked in position and the holder is placed in proper position on the machine by means of the cooperating registration means carried on the machine. This method of registration is accurate, and is very easily and quickly accomplished.

The invention consists in the method which is herein described according to the preferred manner of practicing the same, and in the novel features, arrangements, combinations and construction of parts of the apparatus, and means also hereinafter described in accordance with certain preferred embodiments thereof.

One object of the invention is to provide a method and apparatus for efficiently and accurately securing the registration position of an article.

Further objects of the invention will more fully appear from the following description, taken in connection with the accompanying drawings illustrating embodiments of the apparatus, and in which:—

Figure 3 is a perspective view of the registration apparatus.

Figure 4 is an enlarged partial transverse sectional view taken on line 4—4 of Fig. 3.

Figure 5 is a perspective view of a modified and preferable form of the adjusting mechanism of said registration apparatus.

Figure 6 is a similar view of the same showing its relation to the holder frame prior to physically engaging the same.

Figure 7 is a special form of removable dowel pin adapted for use with this registration device.

Figure 8 is a rear elevational view of the photo-composing machine.

Figure 9 shows another modification of the adjusting mechanism of the registration apparatus.

Figure 10 is a sectional view taken on line 10—10 of Figure 9 drawn to an enlarged scale.

Figure 11 is a perspective view of a registration apparatus, provided with the modified adjusting mechanism shown in Fig. 9.

Figure 12 is an illustration of the manner of composition, by which an image or circumscribed fragment thereof on a photographic plate is adjusted in a certain relative position to a sensitized sheet, either blank, or already partly printed.

Figure 1:
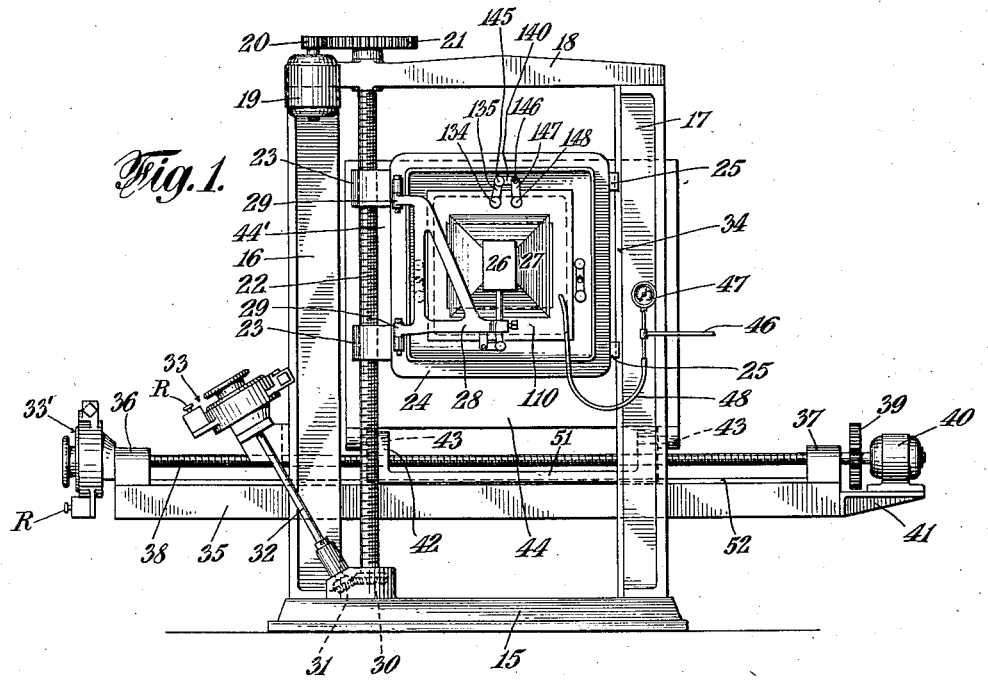
Figure 1 is a front elevational view of a photo-composing machine illustrating the type on which the object to be registered may be used.

The machine includes a base 15 having uprights 16 and 17 connected by a cross beam 18 at their upper ends, these elements constituting a rigid frame.

Carried on the upright 16 is an electric motor 19 having on its shaft a pinion 20 meshed with a gear 21 mounted on the upper end of a vertical shaft 22 journalled in the beam 18 and base 15, and provided with screw threads between its bearings.

Engaging the screw shaft 22 are a pair of spaced lugs 23—23 extending from a negative holder 24, provided at its opposite edge with guide lugs 25 engaging a guide rail 34, integral with the upright 17.

A lamp housing 26 having a hood 27 is pivotally and adjustably carried on a support 28 connected with hinges 29 to the holder 24 at points adjacent the lugs 23, thus permitting the lamp to be readily swung into an operative position, central of the holder or away at will.

At the lower end of the shaft 22 is a bevel gear 30, meshing with a mating gear 31 fixed on an inclined shaft 32 and having at its upper end a manually operable rotating means 33, including an accurate adjusting device and electric controls for the motor 19, substantially consisting of an electric switch with stops marked F, S, and R, viz. standing for fast, slow and reverse starts, the connecting wiring and details not being shown, these being well understood by those skilled in the art.

A horizontal beam 35 is fixed to the rear of the uprights 16—17 at their lower portions, to extend outwardly at each end, and is provided with brackets 36—37 in which is revolubly mounted a screw-shaft 38.

Fixed on the end of the shaft, adjacently beyond the bracket 36, is a similar manually adjustable head 33' and at the opposite end is a gear train 39 driven direct by an electric motor 40, carried on a bracket 41 fixed to the beam 35.

A pair of spaced lugs 42 form extensions of a slide 51, running on a dovetailed guide rail 52 (see Figs. 1 and 2), the latter being an integral part of beam 35. These two lugs engage the threads of the screw shaft 38 and connected to these lugs by pivots 43 is a press bed 44, capable of folding horizontally outward or vertically upward into parallel position with the holder 24, where it may be secured to spring catches 53, engaging a detent 54, fastened to the cross bar 45, attached to the frame uprights 16 and 17.

It will now be apparent that the holder 24 may be raised or lowered to any desirable extent by power and finally accurately adjusted by hand; also that the press bed 44 may be moved in a similar manner in a horizontal plane, and that such movements are wholly independent.

Figure 2:
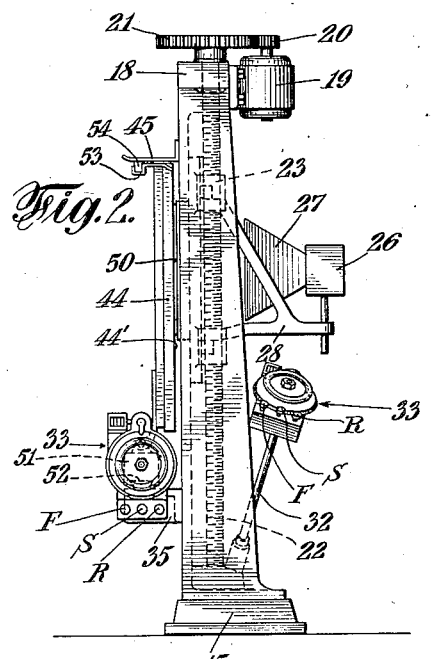
Figure 2 is a side elevational view of the same.

As shown in Figure 1 a pipe 46, from a vacuum producing device, as an air pump, is connected to a gage 47 carried by one of the uprights; another branch of the pipe has engaged on it a flexible tube 48 leading through a duct in the border of the holder 110—not especially shown in the detailed illustration, Figure 3, of the same—to the space between the blank held on the press bed 44 and negative carried in the holder 24.

This space is substantially sealed around the border by a soft rubber flange 59; indicated on the drawings so that, when a suction is created, the blank sheet is drawn into close contact with the photographic plate or negative. But as this feature of the photo-composing machine is fully described in a former U. S. patent application, Serial #292,877, further detailed description may be dispensed with.

The rear view of the photo-composing machine (Figure 8), besides the parts already described and indicated by the same numerals, shows some additional modifications and features which are optional. They consist of a more elaborate construction of the press bed, just described.

Instead of being formed as a single frame, adapted to be swung as a whole into a horizontal or vertical plane, it may consist of an outer frame, 44a, permanently held in a vertical position, and an inner frame, 44b, pivoted on three hinges 43a, fixedly attached to the outer frame 44a. In the upper end of these hinges, as well as in two cooperating hinge-shaped extensions 43b of the inner frame is journalled a shaft 56, around which the inner frame may be swung.

Two strong helical springs 57, wound around the shaft and held in place by collars 58, on the shaft, and staples 59, attached to the outer frame and clasping one end of the spring, while the other free end of the spring bears on the inner frame, are in this way under such resilient strain, that they always tend to swing the inner frame upwardly into vertical position.

The spring catch 53a, engaging the dog 54a, fastened to the cross bar 45a, serves to secure it in this position. The cross bar in this case is made an accessory part of the outer frame 44a.

The outer frame, being permanently in a vertical position, must be movable in a horizontal direction longitudinally, is therefore not hinged at the base, as before, but is fixedly supported on two saddles 42a, engaging the threads of the screw shaft 38 and running on the dovetailed guide rail 52.

The outer frame furthermore is here shown with an auxiliary attachment, serving as a sight-gauge or diopter. It consists, in the main, of an upright cross 60, with equal arms, slotted throughout and at one end of the horizontal arm rigidly attached at 61, to one side of the outer frame 44a, formerly described. If, for convenience, the cross is hinged instead, so that it may be folded back, when not in use, means must be provided, cooperating with the hinge, whereby the cross can be accurately secured in a plane, parallel with the holder 24.

Over the slotted arms of the cross are slidably arranged four sight-vanes 62, consisting of a saddle-like plate, embracing the cross-arm, and provided with a slit, parallel with the slots of the cross-arm. This slit contains in each case a cross-hair along its center line or is provided with a magnifying lens bearing such cross-hair mark. Obviously such sight-gauge device is helpful in locating and checking up on the registration marks, later on to be described.

In order to facilitate registration of the negative in a definite predetermined position relative to the sensitized blank, and thereafter bodily transfer the negative to a photo-composing machine, the devices shown in Figures 3 and 5 are used.

In these views the numeral 100 designates a rectangular table having a thickened edge 101 and provided with a central opening bordered by an inner flange 102 recessed to receive a reference plate 103, such for instance as ground glass, held in position by clamps 104.

As indicated by 106—107 the photographic printing plate 133 bears reference marks which, as the plate is transparent, may be brought into coincidence with registration marks on the plate 103.

Bosses 108 extend upwardly from the table 100 to receive adjustable thumb screws 109 used to support a photographic plate holder 110 described in detail further on.

A block 111 on the table 100, near one end and offset from its longitudinal center line, is provided with an undercut groove longitudinally of the table to receive a slide 112 movable by a screw 113 operated by a hand-wheel 114 and supported at its outer end in a bearing 115.

The slide 112 is provided with a transverse under cut groove, substantially at a right angle to the groove for the slide 112, intermediate its length to receive a cooperating portion of a cross slide 116, movable by a screw 117 operated by a hand wheel 118, the outer end of the screw being supported by a bearing 119.

The cross slide 116 identical to the slide 112 but reversed therefrom is provided with a transverse recess to receive a latch 120 to swing on a pivot 121, its outer end having a pin 122 engageable in a recess in the plate holder 110. Thus it will be seen that by rotating the wheel 114 the latch pin 122 will be moved longitudinally of the table, and by rotating the wheel 118 the pin will be moved at a right angle to the longitudinal movement.

A second block 123 is positioned on the opposite end of the table 100 in corresponding relative position to the block 111, and is provided with a longitudinal groove carrying a slide grooved transversely to receive a slide 124.

The lower slide is provided with a screw 125 having a hand wheel 126 by which it may be moved cross-wise of the table and in the top of the upper slide 124 is a longitudinal recess in which is a latch 127 held by a pivot 128, and at the free end of the latch is a pin 129 engageable in an opening in the plate holder 110.

Thus it will be seen that the latch pin 129 may be moved by the hand wheel 126 transversely of the table and as the slide 124 is free to move longitudinally of the table, motion may be transmitted to it through the hand wheel 114 due to the engagement of the pins 122 and 129 in the plate holder 110.

This holder 110 is provided with down-reaching flanges 130 forming an open box-like frame and is provided with clamps 131 held adjustably against the outer surface of the frame by screws 132; the lower, inner edges of the clamps 131 present bevelled surfaces adapted to engage the edges of a photographic plate 133, such as glass or some flexible substance, with its image bearing surface facing downwardly, and in this instance may be either a positive or negative from which it is desired to print onto a sensitized surface.

The holder 110 is provided midway each end with openings to be engaged by thumb clamp screws 134 which pass through slots in plate arms 135, firmly clamping them to the holder when it has been adjusted, the outer ends of the arms having openings to neatly receive dowels 136 set in posts 137 raised from the table 100 and around which the arms may be swivelled.

Referring now to Figure 1, the frame 24 is shown mounted on the machine and is movable vertically by the screw shaft 22, while the blank is carried by the bed plate 44 movable horizontally by the screw shaft 38.

The frame 24 carries fixed dowel pins 24' arranged in ninety degree relation and in identical correspondence with the dowels 136 of the table 100.

It will therefore be seen that when the holder 110 is positioned with respect to the table 100 and the thumb screws 134 tightened, the holder can be removed from the table and placed on the frame 24, the openings in the arms 135 engaging the dowels, effectually serving to correctly register the plate 133 with respect to the frame 24 and the photo-composing machine in general.

In order to facilitate transference of the holder 110, the more elaborate and expedient device shown in Figure 5 may be substituted for plain dowel pins; this device consists of anchor brackets 140 rigidly secured to a suitable support, for instance to the post 137 on the table 100, and similarly to the frame 24, as indicated on Figure 1. These brackets 140 have an outstanding member 141 carrying on its face a pair of spaced guide lugs 142—143, between which the arm 135 may be entered.

At the top of the member 141 is a similar lug 144 and all these lugs are bored to receive a headed dowel pin 145 to pass through the end opening in the arm 135 rigidly maintaining the holder in its correct position.

Pivoted on the bracket 140, by a screw 146 is an arm 147 adapted to swing over the holder, the arm being provided with a clamp screw 148 by which the holder may be held firmly to the frame.

As it often proves difficult to insert two or more dowel pins, rigidly positioned on one element, into corresponding pin holes on another element, if they are not exactly in register, a certain modification of dowel pins, as described hereafter and illustrated in Fig. 7, will be found advantageous.

The upper part of the pins 150, which rests in the stationary element, in this case lug 143', is threaded and of a larger diameter than the lower smooth end of the pin, by the double depth of the thread. The lower end 152, which is inserted into the removable element, in this case the arm 135, is closely fitted into its straight dowel hole, but its extremity is tapered for a short distance, as shown at 153, so that, when the two elements are approximately superimposed, the tapered ends of the dowel pins, when being screwed downwards, force the elements into alignment.

The lower lug 142' would form the support of 135 and correspond to 142 in Fig. 5, whereas the top lug 144 in this device can be omitted, as the threaded part affords sufficient guidance for the dowel pin.

Figures 9, 10 and 11 illustrate a modification of the registration apparatus formerly described. As a comparison of Figures 3 and 11 will show, the difference consists mainly in another arrangement and combination of the sliding elements controlling the upward and downward and the transverse adjustments, respectively, of the photographic plate holder, the operative principle, viz. control by the alternate pull and push of two adjusting screws for movement in either direction remaining the same.

Parallel to one side of the rectangular frame 160, Figures 9, 10 and 11, which corresponds to the formerly described table 100, is provided a shaft 161, journalled at its ends in two solid pillow blocks 162, integral with and situated in two opposite corners of the frame. The shaft at about the middle of its length is furnished with an arm 163, extending at a right angle to its axis. The end of the arm is rotatably engaged with an adjusting screw 164 which is threaded through a stationary bracket 165, fastened to the frame 160. The rotatable connection of the screw end with the arm 163 may be accomplished in various ways, for instance by turning down the screw end to its root and securing the perforated arm on it by a cotter pin or between two washers, 164a, over the outer one of which the shaft end is riveted or burred over. It is obvious then, that if the adjusting screw by its knurled hand knob 164b is turned either way, the shaft 161 and whatever is rigidly connected therewith, moves forward or backward in its bearings.

Parallel to the axis of this shaft lies a bar 166, not attached to but freely supported by the rectangular frame 160. This bar is furnished with two upright lugs 167 which are in alignment with two other upright lugs 168, rigidly attached to the shaft 161. At right angles to both the shaft and the bar, the bar lugs are drilled and the shaft lugs threaded, so that each shaft lug may be coupled with one bar lug respectively through adjusting screws 170, Figs. 9 and 10.

These elements, while being threaded through the shaft lugs, must rotate freely in the bar lugs, which they must grip from both sides by some offsets or collars. They may consequently be formed in different ways, for instance by a construction as formerly described for adjusting screw 164, or preferably in the manner illustrated in Fig 10 and described henceforth.

The screw 170 is reduced so as to pass with considerable clearance through the hole in the lug 167, its plain end extending through the lug 167, being inserted into a hole of the hand knob 172. A cotter or plain tapered pin 173 joins this knob and the reduced end of the screw rigidly together. The diameter of the hole in the lug is intermediate between the outside diameter of the screw or the stem of the hand knob and that of the reduced end of the screw, so that, when the screws are unevenly adjusted and the bar therefore would lie at a slight angle to the shaft, the screw-necks can turn freely within the lugs without any undue strain.

The connection between the plate holder 110 and the adjusting bar 166 is effected by two short straps, 175, Figs. 9 and 10, or 175', Fig. 11 where their free ends are coiled. These straps are either permanently welded or otherwise fixedly attached to the holder frame and have a detachable connection with the bar, for instance, by means of a dowel pin 175a as shown in Fig. 10, or vice versa; they are permanently hinged to the bar 166, as at 175b, Fig. 11, and connect with the holder by means of dowel pins 175c.

In either case it is obvious that the holder frame, following the movements of the adjusting bar, whether these may be directed upwards or downwards, crosswise or turning at an angle, can be brought into any precise and required position.

All other features of the table and the plate holder can be identical with those of the first registration apparatus described.

*Operation*

The ground glass plate 103 is provided with visual registration means which may be a line extending across the plate in a transverse direction or cross lines extending longitudinally and transversely thereof respectively. The photographic printing plate is provided with visual registration marks 106, which it is desired to bring into registration with the registration marks on plate 103 in order that the plate 133 will be set on the machine shown in Figure 1 in proper registration with respect to the frame 24.

The plate 133 having been clamped to the plate holder 110, by means of the clamps 131, the holder is placed on the thumb screws 109 which are adjusted so that the photographic plate 133 is substantially parallel to the ground glass plate 103 with the emulsion side of the plate 133 just clear of the plate 103, in order to prevent scratching the emulsion. The thumb screws 134 are loosened to allow the arms to be moved with respect to the holder 110, and the holes in the outer ends of the arms 135 are engaged by the dowel pins 136. The latches 122—127 are now swung about their respective pivots 121—128 to bring their pin engaging ends into cooperative recesses formed in the marginal edges of the holder 110. By rotating the hand wheels 118 and 126 in the same direction and at the same speed, the slides are moved in substantial parallelism to thereby move the plate 133 with respect to the plate 103. By rotating the hand wheel 114 the slide 121 is moved in a transverse direction, moving the latch 120 with it, and through the intermediary of the holder 110 moving the latch 127. By rotating the wheel 118 merely, or by rotating the wheel 118 in one direction and the wheel 126 in the opposite direction, or by rotating the wheel 126 merely, the plate 133 is given an angular motion with respect to the plate 103. Hence, it will therefore be seen that by manipulating one or more of the adjusting means in the manner above described, the registration marks on one plate may be brought into accurate alignment with the registration mark or marks on the other plate, thereby adjusting the plate 133 to the desired relative registration point. When the correct registration has been obtained, the thumb screws 134 are screwed down, clamping the arms 135 rigidly to the holder 110 whereby the holes engaging the dowel pins 136 or 145 will be maintained in a fixed relation. The latches 120 and 127 are now swung about their respective pivots thereby releasing the holder 110 from the table 100. The holder 110 may now be removed and placed in the frame 24 where the fixed dowel pins of the frame or the dowel pins 145 will accurately engage the dowel holes in the outer ends of the arms 135 thereby accurately registering the photograph plate 133 with respect to the frame 24 and the photo-composing machine carrying the same.

If instead of the registration apparatus, shown in Figure 3 the modified form, shown in Figure 11 is used, the operation is quite analogous, as will be apparent to those skilled in the art.

It will be obvious that instead of having the separate table 100 together with its associated parts formed separately from the photo-composing machine, the parts carried by the table 100 may be formed as a part of the frame 24 of the photo-composing machine, or as a part of additional structural members attached or associated with the frame 24. However, due to the great cost of the photo-composing machine, it is desirable to employ a separate unit, such as the table 100 and its associated parts, in order that the photo-composing machine may be used for actual photo-composing work while the separate unit, or a plurality of units, may be independently used for performing the first part of the operation.

Supplementary to the explanation of what Figure 12 illustrates, as already given, it may be added that the plate holder is designated by numeral 24. The photographic negative 133 which may be of odd size is held in position by some opaque sheet 133' which has a cutout 133a, exposing the desired area of the negative. The sensitized sheet 49 which is fastened independently in the rear on the ground glass of the press bed 44, is adjusted to the proper position to receive the image to be printed through the cutout.

It will be seen that the apparatus described may be used on other machines to advantage, either as separate units or as a part thereof. It is also intended that the invention as disclosed may be used independently in various ways which will be apparent to those skilled in the art.

Although the foregoing is descriptive of the preferred embodiment of the invention, it will be apparent that minor changes may be made in its construction, without the exercise of invention or conflicting with the scope of the claims hereto appended.

Having thus described the invention, what is claimed as new and desired to secure by Letters Patent, is:—

1. Registration apparatus comprising a first member, a second member relatively movable with respect to said first member, adjustable physical registration means attached to one of said members and selectively movable relative thereto, means attached to the other of said members for engagement with said registration means to cause relative movement between said registration means and its attached member when said first and second members are moved relatively, and locking means for fastening said registration means in place when said registration means has been moved to an adjusted position.

2. Registration apparatus comprising a first member, a second member relatively movable with respect to said first member, first and second member adjusting means attached to one of said members, each having means for engaging and disengaging the other of said members, both of said adjusting means being movable in substantial parallelism in one direction and one of said adjusting means being movable in a direction transverse to said first mentioned direction.

3. Registration apparatus comprising a first member, a second member relatively movable with respect to said first member, adjusting means attached to one of said members, each being provided with means for engaging the other of said members, said adjusting means being movable in substantial parallelism in one direction but each independently of the other, and one of said adjusting means being movable in a direction at an angle to the first named direction, whereby said first and second members may be adjusted one with respect to the other in longitudinal and transverse directions and also angularly.

4. Registration apparatus comprising a first member, a second member relatively movable with respect to said first member, first and second adjusting means attached to said first member each having latch means for releasably engaging said movable second member, both of said adjusting means being movable in substantial parallelism in one direction and one of said adjusting means being movable in a direction transverse to said first mentioned direction, and an actuating device on each of said adjusting means by which said members are movable.

5. Registration apparatus comprising a first member, a second member for carrying an article to be registered with respect to a reference member, said second member being movable with respect to said first member, said first member having a plane surface, adjusting means attached to one of said members, each having pivoted latches for engaging the other of said members to move the same back and forth, said adjusting means being movable in substantial parallelism in a plane substantially parallel to the plane surface of said first member, and one of said adjusting means being movable in a direction transverse to said first mentioned direction whereby said article may be moved back and forth in each of two transverse directions and angularly moved in the same plane by one of said adjusting means.

6. Registration apparatus comprising a first member, a second member for carrying an article to be registered with respect to a reference member, said second member being movable with respect to said first member, said first member having a plane surface, means for positioning the mentioned plane surface and said article in the desired degree of parallelism, first and second member adjusting means attached to one of said members each having means including pivoted latches carrying pins for engaging the other of said members to move the same in one direction in a plane substantially parallel to the mentioned plane surface and one of said adjusting means being movable in a direction transverse to said first mentioned direction, whereby said article may be moved back and forth in each of two transverse directions and angularly moved in the same plane by said adjusting means.

7. Registration apparatus comprising a first member having a plane surface, a second member having a second plane surface to be registered with respect to a reference member, said second member being relatively movable with respect to said first member, means for positioning said plane surfaces in the desired degree of parallelism and for spacing the plane surfaces apart and for supporting one of said members, adjusting means attached to one of said members and each having means for engaging the other of said members, said adjusting means being movable in one direction, in a plane substantially parallel to the first mentioned plane surface and one of said adjusting means being movable in a direction transverse to said first mentioned direction, whereby one of the first and second plane surfaces may be moved in two directions and angularly moved in the same plane by one of said adjusting means.

9. Registration apparatus comprising a first member, a second member relatively movable with respect to said first member, first and second member adjusting means attached to one of said members each having means for engaging the other of said members, both of said adjusting means being movable in substantial parallelism in one direction and one of said adjusting means being movable in a direction transverse to said first mentioned direction, adjustable physical registration means attached to one of said members and selectively movable with respect thereto, means attached to the other of said members adapted for engagement with said physical registration means to cause relative movement between said registration means and its attached member when said first and second members are moved one with respect to the other, and locking means for fastening said registration means in place when said registration means has been moved to the proper position.

9. Registration apparatus comprising the combination with a machine having first physical registration means in fixed relation to a portion thereof, of a holder adapted to be positioned with respect to said machine by said first physical registration means and adapted to carry a part to be operated upon in connection with said machine, and second physical registration means attached to said holder and adapted to engage said first registration means and selectively adjustable with respect to said holder.

10. In registration apparatus, the combination of a relatively movable and a relatively stationary part, adjusting means carried by one of said parts and adapted to engage the other of said parts to cause said relative movement between said parts and comprising a first member movable back and forth along one axis, a first control means for moving said first movable member back and forth, a second member movable back and forth along an axis transverse to said axis and also movable with said first movable member, a second control means for moving said second movable member back and forth along its said transverse axis, and dowel elements fixed on one of said parts to engage in clips adjustably carried by the other part whereby the parts may be held in adjustment.

11. In registration apparatus, the combination of a relatively movable and a relatively stationary part, adjusting means carried by one of said parts and adapted to engage the other of said parts to cause said relative movement and comprising a first member movable back and forth along one axis, a single first control means for moving said first movable member back and forth, a second member movable back and forth along an axis transverse to said axis and also movable with said first movable member, a single second control means for moving said second movable member back and forth along its said transverse axis, said adjusting means including hinged elements to swing into positive engagement with the relatively movable part to transmit movement thereto.

12. In registration apparatus, the combination of a relatively movable and a relatively stationary part, adjusting means carried by one of said parts and arranged to engage the other part to cause said relative movements, said means comprising a first member movable in a certain path, a first control means for causing movement of said member in said path, a second member movable in a path that is transverse the first named path and which is also movable with said movable member, a second control means arranged to move said second member in said certain path without affecting the movement of said first member in said certain path, and a latch pivotally carried by the said second member of said adjusting means to engage and disengage said movable member.

13. In registration apparatus, the combination of a relatively movable and a relatively stationary part, physical registration means on each of said parts, adjusting means carried by one of said parts and adapted to engage the other of said parts to cause said relative movement and comprising a first member movable back and forth along one axis, a first control means for moving said first movable member back and forth, a second member movable back and forth along an axis transverse to said first named axis and also movable with said first movable member, and a second control means for moving said second movable member back and forth along its transverse axis, said control means being also operative in effecting angular movement between said relatively movable parts.

14. In registration apparatus for two relatively movable objects one having registration marks, means fixed on one of said objects to move the other object in a straight path to cause registration of said marks with corresponding marks on a fixed surface, other means fixed on the first object to move the second object in a path transverse in direction to the first movement to cause registration of the remaining marks and latches pivoted in said means to engage and disengage the second object.

15. In registration apparatus for two relatively movable objects one having registration marks, means fixed on one of said objects to move the other object in paths to cause registration of said marks with fixed marks corresponding thereto, clamping means adjustable on the second object, said clamping means being wholly removable, and means on the first object engageable by said clamping means to positively retain said objects in adjustment.

16. In registration apparatus for two relatively movable objects each having registration marks, screws carried by one object to adjust the other object in any direction along a common plane to cause registration of said marks, certain of said screws being arranged in different planes and on opposite sides of the other object, and members co-operative between said objects to positively retain the objects in adjustment.

17. In registration apparatus for two objects relatively movable in parallel planes, a single means for producing relative motion of said objects in one direction, two single means for producing motion in a direction transverse to that obtained by said single means, said means being fixed on one of said objects and removably engageable with the other object, dowel posts fixed on the first object, members adjustably carried by the other object to engage said posts, said members being removable at will, and means to rigidly clamp said members when said objects are in predetermined relation.

18. In registration apparatus, the combination of two parts, relatively fixed and movable, adjusting means carried by said fixed part adapted to engage the movable part to cause relative movement, said means comprising a member movable reciprocatively along one axis, control means for actuating said member, a second member movable reciprocatively along an axis transverse to said first named axis, said second member being also movable with the first named member, a second control means for actuating said second member along its transverse axis, and latch connections hingedly carried by said second member adapted to pivotally engage the movable part for effecting angular movement relative to said fixed part.

19. In registration apparatus for two relatively movable objects, a single means on one of the objects to positively move the other object linearly with respect to the first object, two spaced independent means on the first object to move the second object in a direction transverse to the first movement, latches hingedly combined with said moving means, and pivots carried by said latches to engage one of said movable objects whereby a limited relatively angular movement of the objects may be produced.

20. In registration apparatus for a machine having rigid dowels, a fixed object having corresponding rigid dowels, and a movable object, means on said fixed object to adjust the movable object in conformity with co-operative registration marks on the fixed object, members adjustably carried by said movable object to engage the dowels on the fixed object, and means for clamping said members with respect to the movable object whereby said movable object may be transferred from said fixed object to said machine in its exact relation upon engagement with the dowels carried thereby.

21. In registration apparatus for a machine having rigid dowels, a fixed object having corresponding rigid dowels, and a movable member engageable on said machine and said fixed object, adjustable means on said member to engage said dowels, means carried by said fixed object to adjust said member in predetermined relation thereon, and means to clamp said adjustable means with respect to the movable object when in a predetermined position whereby said movable member may be transferred from said fixed object to said machine.

22. In registration apparatus for a fixed and a movable object, a shaft slidably carried by said fixed object, lugs fixed near the ends and center of said shaft, a screw mounted on said fixed object to move said shaft longitudinally by engagement with its center lug, a bar floatingly carried by said fixed object normally parallel with said shaft, screws carried by the end portions of said bar engaging the end lugs of said shaft, said screws controlling the distance apart and angular relation of the bar and shaft, and latches pivoted on said bar having dowels to engage in corresponding holes in said movable object.

23. In registration apparatus for a fixed and a movable object, a shaft slidably carried by said fixed object, lugs fixed near the ends and center of said shaft, a screw mounted on said fixed object to move said shaft longitudinally by engagement with its center lug, a bar floatingly carried by said fixed object normally parallel with said shaft, screws carried by the end portions of said bar engaging the end lugs of said shaft, said screws controlling the distance apart and angular relation of the bar and shaft, clips fixed on said movable object, and dowels carried by said clips to engage in openings in said bar.

24. In registration apparatus for a fixed and a movable object, a shaft slidably carried by said fixed object, lugs fixed near the ends and center of said shaft, a screw mounted on said fixed object to move said shaft longitudinally by engagement with its center lug, a bar floatingly carried by said fixed object normally parallel with said shaft, screws carried by the end portions of said bar engaging the end lugs of said shaft, said screws controlling the relation of the bar and shaft, latches hinged on said bar to engage said movable object, dowels on said fixed object, adjustable clips on said movable object to engage said dowels, and means to clamp said clips when in adjusted position.

25. In a photo-composing machine, a table provided with registration indications, a plate holder, removably mounted on the table, means on the table for moving the holder into predetermined position relatively to said table as determined by said indications, and for determining said relative position, means for supporting said holder when said holder is transferred thereto from the table, and means on the supporting means for retaining the holder in that position corresponding precisely to the predetermined position into which the holder is moved by said moving means relatively to the table.

26. In registration apparatus, a stationary part, a plate holder, plate-clamping means on said holder, adjusting means on the stationary part adapted to releasably engage the holder to cause relative movement therebetween, said adjusting means comprising a reciprocatory member, means for actuating said member in a straight path, a second reciprocatory member, means for actuating said second member in a straight path transverse to the path of movement of the first member, said means permitting the holder and the plate held thereby to assume an angular relation to the stationary part, and means for clamping the holder to said stationary part when in adjusted position.

HARRY C. JONES.